Oct. 13, 1970 W. H. KAUTZ 3,534,331
ENCODING-DECODING ARRAY
Filed Aug. 15, 1967 3 Sheets-Sheet 1
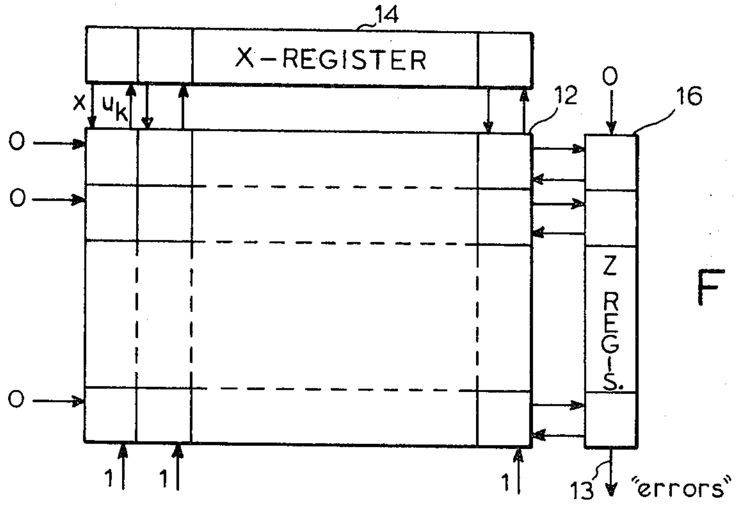
FIG. 1
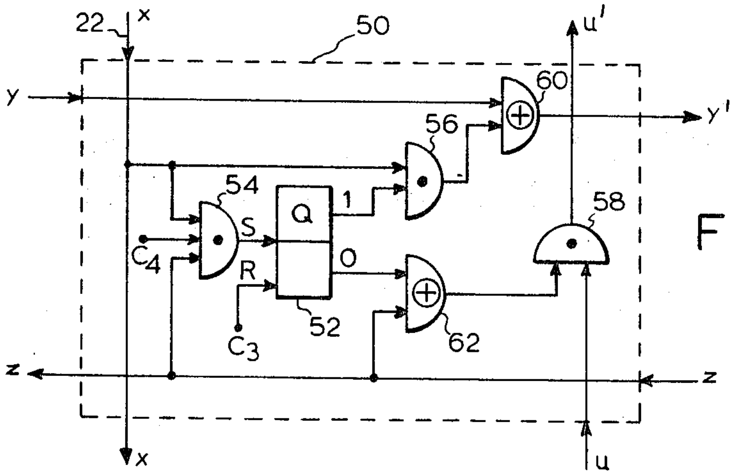
FIG. 2
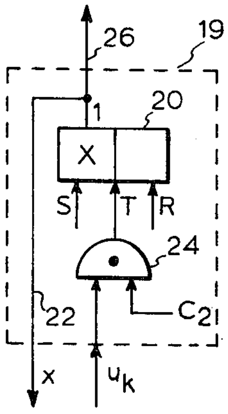
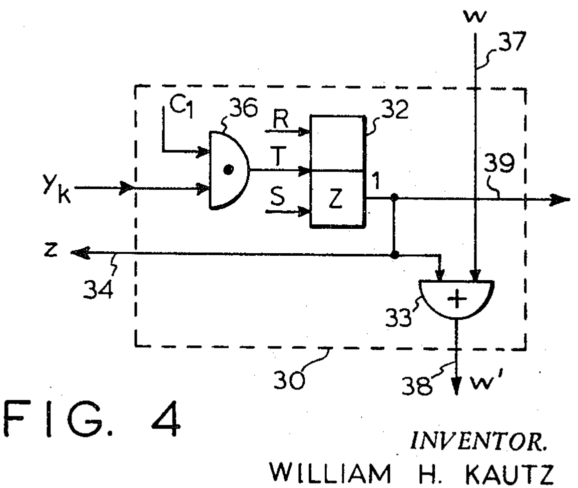
FIG. 4
FIG. 3
INVENTOR.
WILLIAM H. KAUTZ
BY Lindenberg & Freilich
ATTORNEYS INVENTOR.
WILLIAM H. KAUTZ
BY Lindenberg + Freilich
ATTORNEYS INVENTOR: WILLIAM H. KAUTZ
BY: Lindenberg & Freilich
ATTORNEYS

United States Patent Office 3,534,331

Patented Oct. 13, 1970

3,534,331

ENCODING-DECODING ARRAY

William H. Kautz, Woodside, Calif., assignor to Stanford Research Institute, Menlo Park, Calif., a corporation of California Filed Aug. 15, 1967, Ser. No. 660,832
Int. Cl. G08c *25/00*; H04l *1/10*
U.S. Cl. 340—146.1 20 Claims

ABSTRACT OF THE DISCLOSURE

A logic network for use in digital data systems for encoding and decoding data in accordance with single-error-correcting codes, which uses an array of identical cells, each connected only to the adjacent cells, in a two dimensional arrangement which is adapted for realization by integrated semiconductor technology.

BACKGROUND OF THE INVENTION

This invention relates to digital logic circuits which are especially useful in digital computers, digital data transmission and the like.

Digital data processing equipment is often provided with means for detecting and even correcting errors which may be anticipated. Such errors may arise from defects in components or background noise; for example, in a digital computer a component with too low an output may cause the registration of a 0 instead of a 1 bit and the word containing that bit will be in error. Another example is in data transmission in the presence of appreciable noise which may cause the registration of a 1 bit for a 0 or vice-versa. One means for reducing errors involves the attachment of extra bits to each block of data, or word, in a way which makes the detection and correction of certain errors possible.

Perhaps the simplest kind of error-detecting scheme involves the addition of extra bits referred to as "parity" bits or check digits, each associated with certain bit positions of the word. According to one scheme, if there is an odd number of ones in the bit positions monitored by a check digit, then that check digit is one, and if there is an even number of ones then that check digit is zero. As a result, the number of ones in each group of monitored data digits plus the check digit is always even. One or more of the circuits which transmit and store the words can be checked to determine whether a single error exists by checking for an odd number of ones in a monitored group plus its check digit, an odd number indicating an error. If enough check digits are used, each monitoring a different set of data digits, then the scheme provides an indication as to which single data digit is in error, so it can be corrected. In a similar fashion, multiple errors can be detected or even corrected.

Digital computers and other systems which employ error-correcting codes typically requires the use of a large number of circuits for encoding the words according to the error-correcting code used, and for decoding or checking words to detect or correct the errors. Heretofore, such circuits have generally been constructed as networks of components connected in a complex manner. Because of the complexity, such circuits have required considerable effort for design, fabrication, and testing and diagnosis of failures. The use of encoding-decoding circuits which employed many simple cells, regularly interconnected, and all identical, so as to enable a concentration of design efforts on perfecting the design, which was readily adapted for economical manufacture, would make an important contribution to the field of digital data processing equipment.

SUMMARY OF THE INVENTION

This invention provides a circuit for encoding and decoding (for error detection and correction) digital data in accordance with multiple-error-correcting codes, by utilizing an array having a large number of identical cells connected to each other in an identical manner. The cells are arranged in a two-dimensional structure which is well adapted for fabrication by integrated semiconductor technology. As a result of the fact that the cells are identical, it is economical to apply large efforts to the design of the individual cell and its connections, enabling high efficiency and reliability and high packing densities. The array design of the invention has great flexibility which allows a circuit to encode and decode in accordance with any of a large number of codes which can detect the presence of several errors for high noise environments, while enabling the switching to a shorter code for lower level noise environments to increase data transmission rates. The flexibility also enables the bypassing of particular portions of the array which contain defects, while allowing the rest of the array to be utilized; accordingly, isolated defects do not cause rejection of an entire circuit and production costs are decreased. The design of the array provides a small number of external leads from each cell, and each gate has small fan-in and fan-out (i.e. the gates have few inputs and drive few other gates), so that low power levels and high speeds can be employed. Thus, the circuit is well adapted for fabrication by integrated circuit techniques to enable low cost, high speed, and high reliability.

The array of the invention comprises a large number of identical logic cells arranged in rows and columns. An X register is provided at one edge of the array for entering the data digits of a word which is to be encoded or decoded. A Z register is connected along another edge of the array for holding the check digits which are added to the data digits to provide a complete code word.

Each cell of the array has a flip-flop which is set or reset prior to the use of the array, for establishing a particular coding scheme. By choosing which of the cells is set or reset, a particular coding scheme is established for future encoding and decoding of words. Each cell also contains logic circuitry for use during encoding, that is, the generation of check digits from a data word, so as to provide a complete word. Such logic comprises connections for receiving a digit entered into an X register cell and bussed to all cells in that column of the array, connections for receiving a digit generated by a neighboring cell, and logic circuitry for combining the various inputs to the cell and its state, and for transmitting signals to another neighboring cell in accordance therewith. Such circuitry enables the determination of each check bit from a word containing only data digits, to provide a complete word.

Each cell of the array also has logic circuitry for correcting a data word portion by entering the data word in the X array and entering its check digit portion in the Z array. The circuitry compares the check digits with the stored digits and delivers a signal to the X register cells which corrects any single error.

BRIEF DESCRIPTION OF THE DRAWINGS

FIG. 1 is a representation of an encoding-decoding array constructed in accordance with the present invention;

FIG. 2 is a schematic diagram of one cell of the main array of FIG. 1;

FIG. 3 is a schematic diagram of an X register cell of the X register shown in FIG. 1;

FIG. 4 is a schematic diagram of a Z register cell of the Z register shown in FIG. 1;

DESCRIPTION OF THE PREFERRED EMBODIMENTS

Figure 5:
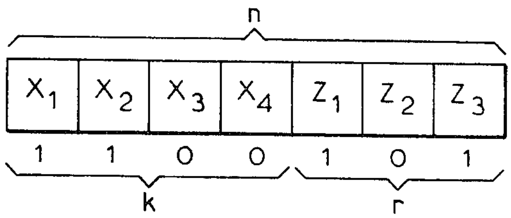
FIG. 5 is a representation of a typical complete code word showing the positioning of its digits in X and Z register cells.

FIG. 1 illustrates an embodiment of the invention comprising an array 12 of cells arranged in columns and rows and having numerous connection terminals along its edges, an X register 14 connected along one edge of the array, and a Z register 16 connected along another edge of the array. The circuit can be used to receive information digits, or data digits, and to generate check digits which are used to augment the data digits for realizing a complete code word. The circuit also can be used to receive a complete code word to check for the existance of any number of errors and to correct the code word to eliminate a single error. Single-error-correcting codes are well known in the art. Such codes typically involve the addition of check digits to an original data word to enable the correction of the data word if a single error occurs. Some of the coding schemes also enable the monitoring of a word to detect the existence of several errors, although these codes generally provide only an indication of the existence of multiple errors without providing means for correcting their errors. Inasmuch as multiple errors are very rare in comparison with single errors in many situations, it is often sufficient to merely transmit the data again when multiple errors are detected.

The X register, which receives the data digits of a word, has individual cells of a configuration illustrated in FIG. 3. The X register cell comprises an R-S-T flip-flop 20 which stores a single binary data digit. The flip-flop 20 has three inputs designated S, R and T denoting its set, reset and trigger inputs, respectively. The flip-flop has one output which is utilized in the circuit, that being the output labeled 1, which is sometimes referred to as the true output. The 1 output is high, or in other words represents a 1, when and only when the flip-flop is in a set state. A data digit is entered into the flip-flop 20 by delivering a pulse to the R or S inputs to designate a "0" or "1," respectively. The 1 output is delivered to a vertical or column bus 22, labeled $x$. The X register cell also contains an "AND" gate 24 connected to the trigger input of the flip-flop 20. The AND gate 24 has a clock input $C_2$, and another input labeled $u_k$ for receiving signals from the top cell of a column of cells to cause the flip-flop 20 to change state if an error is detected in the digit which that X cell contains. A corrected digit output line 26 leading from the 1 output of the flip-flop 20 delivers a signal indicating the state of the flip-flop. When the invention is used to correct for single errors in a complete code word, then after progression through the correcting process to be described, a correct digit is transmitted on output line 26.

Each cell of the Z register is identical, and one of such cells is illustrated in FIG. 4. The Z cell 20 comprises a flip-flop 32 for receiving a check digit, which is that part of a code word which serves to check the accuracy of the data digits. The check digit in the flip-flop 32 may be either generated in the array 12 in accordance with the data word entered into the X register, or may be entered directly into the flip-flop 32 of the Z cell in accordance with a check digit from a code word whose accuracy is in doubt. Where the check digit is entered into the flip-flop 32, this is done by delivering a signal on the S or R inputs to the flip-flop to set or reset it to indicate a "1" or "0," respectively. The state of the flip-flop 32 governs the type of output delivered over the 1 output, which is connected to a row bus 34 labeled $z$. Alternatively, when the cellular array 12 generates the check digit, inputs are received on the line labeled $y_k$ and delivered to an AND gate 36 of the Z cell, which also has a clock input $C_1$. The output of the AND gate 36 is delivered to the trigger input of the flip-flop 32 to possibly change the state of the flip-flop. Check digit output line 39 leading from the 1 output of flip-flop 32 delivers a signal indicating the state of the flip-flop. A multiple error output line 38 carries a signal which indicates the state of the flip-flop 32 and of the corresponding flip-flops in other Z register cells, as indicated on line 37, for delivering signals to another circuit which indicates whether any single or multiple errors exist in a code word which is being checked for accuracy.

FIG. 2 illustrates one cell 50 of the array 12 showing its circuitry, which is identical to the circuitry of the other cells of the array. The cell comprises an RS flip-flop 52 (similar to the RST flip-flops of the X and Z registers, except that the T input is not utilized), three AND gates 54, 56 and 58, and two exclusive OR gates 60 and 62. The cell has four inputs and four outputs, for connection to neighboring cells in the column and row in which the cell is located. A first input line 22 labeled $x$ is the column bus for the particular column in which the cell 50 is located. The bus 22 extends completely through the cell so that a down-going output at the bottom of the cell, also labeled $x$, has the same signal. Another input labeled $u$ receives signals from the cell immediately below the cell 50. A corresponding output labeled $u'$ delivers signals to the cell immediately above the cell 50. Similarly, the row bus 34 labeled $z$ transmits a signal horizontally, across the same row. A horizontal input labeled $y$ receives signals from the cell to the left of the cell 50, and an output labeled $y'$ delivers signals from the cell 50 to the neighboring cell to the right. The $x$ and $z$ busses 22 and 34 receive signals from an X and Z register cell of the registers 14 and 16, respectively. Thus, each cell receives a signal from the X register cell of its column and Z register cell of its row, and also transmits or receives signals to or from each of the four neighboring cells.

The purpose of each Z cell is to monitor certain cells in the same row in which the Z cell is located. Each of the monitored cells may receive a 0 or 1 on its $x$ input bus, and determine whether the number of ones on the $x$ inputs is even or odd. The particular cells of each row of the array which are monitored is determined by which code is being used. Whether a particular array cell is being monitored or not depends upon whether its Q flip-flop is in a set or reset state.

Prior to the use of the array, a particular single-error-correcting code is chosen and the Q flip-flops of the cells of the array 12 are placed in appropriate states for encoding and decoding in accordance with that code. This is done by setting or resetting each flip-flop labeled Q, such as the flip-flop 52. This may be done by first resetting all Q flip-flops at the same time by applying a pulse on the line $C_3$ which is connected to the reset input of every Q flip-flop. Then, the Q flip-flop of each cell which is to be set is set one at a time, by applying a signal to the $x$ bus 22 of the column in which that cell lies, applying a signal to the $z$ bus 34 of the row in which the cell lies, and simultaneously applying a signal on the input labeled $C_4$. The array 12 is then ready to perform encoding by entering a data word in the X register 14 and then applying a $C_1$ pulse (to the Z cells shown in FIG. 4), and is also ready for decoding by receiving a coded word in the X and Z registers, and then applying successively $C_1$ and $C_2$ pulses (to the X and Z cells, respectively).

In the circuit shown in FIG. 1, each Z cell of the Z register 16 monitors only particular cells of the array located in the same row. If the total number of 1's in the data word at the positions monitored by that Z cell is odd, the check digit entered into the Z cell is a one, and if the total number of ones in those data word positions is even, the Z cell remains at zero (i.e. remains reset).

The process occuring during encoding at each cell of the array can be appreciated by referring again to the cell of FIG. 2. If that cell is one of the cells which is monitored by the Z register cell of the same row, then the Q flip-flop 52 has been set. On the other hand, if the cell 50 is not one of those so monitored, the Q flip-flop is still reset. We shall assume that the cell 50 is monitored, and therefore Q is set. If the X register cell in the same column is a 1, then a signal is received over column bus 22. The signal on bus 22 enters the AND gate 56 and the set output from Q flip-flop 52 also enters that gate. The AND gate 56 therefore delivers an output to exclusive OR gate 60. If the $y$ input received from the cell to the left of cell 50 is a 1, indicating an odd number of ones applied to the monitored cells to the left of cell 50, then the exclusive OR gate 60 delivers no output on the output line $y'$. This indicates that the total number of ones in the monitored cells up to $y'$ is even. (The extreme left cell of the row is provided with a zero input to its $y$ input terminal, as indicated in FIG. 1.) This type of comparison or addition process, sometimes referred to as modulo-two addition, results in there finally being delivered to the Z cell, shown in FIG. 4 a $y_k$ input which is zero or one depending upon whether an even or odd number of ones has been applied to the monitored cells on the $x$-busses.

Assume that the Z cell 30 had a Z flip-flop 32 which was originally reset. When a clock $C_1$ is applied to AND gate 36, the flip-flop 32 will be triggered if and only if the signal $y_k$ received is a one indicating an odd number of ones applied to the monitored cells of the row. If there is an odd number of ones, flip-flop 32 will change from a reset to a set state. The output, which may be taken at line 39 or row bus 34 after clock $C_1$ is applied, indicates whether that Z digit is a zero or one.

The circuit of FIG. 1 is used for error detection and correction, or decoding, of a complete code word containing data digits and check digits, by entering the data digits in the X register 14 and the check digits in the Z register 16. It does not matter whether the most significant digit is entered into the left or right cells of the register, except that the digits should be entered according to the same pattern employed in encoding. Each of the cells receives a data digit over a column bus 22, and as previously described for the encoding process, all cells in each row of the array deliver $y'$ outputs which are one or zero depending upon whether an odd or even number of ones occur in the data digits to the left. The $y'$ output of the rightmost cell of the array 12, that output being designated as $y_k$ and shown in FIG. 4, enters the Z cell 30. At clock time $C_1$ the $y_k$ input triggers the flip-flop 32 if $y_k$ equals one. If there is no error in the code word, the digit already entered into the flip-flop 32 should be the same as that indicated by $y_k$. If they are the same, that is, if flip-flop 32 is already set and $y_k$ is one, or flip-flop 32 is reset and $y_k$ is zero, then the flip-flop 32 will end up in a zero state. If there is an error, then the flip-flop 32 will end up with a one (i.e. it will be set). The existence of a one output on line 39 and the row bus 34 designated $z$, indicates that an error is present in the code word. This one output is also fed to OR gate 33, resulting in a $w'$ output of one on line 38. In each $z$ register cell below the row in which the error has been sensed, this $w'$ output is received on $w$ line 37 from the cell above and is passed through OR gate 33 to output 38, until a one output appears on the "error" output line 13 shown in FIG. 1. Thus, the presence of the error is detected.

The circuit automatically corrects single errors in the code word. As mentioned above, the existence of an error in any data word results in the output of one or more of the Z cells being a one. Each such one output is bussed along line 34 and enters the exclusive OR gate 62 of each cell in the same row of the array, as shown in FIG. 2. If that cell has a flip-flop 52 which is set, indicating it is one of the cells being monitored by the Z cell, then a zero appears at the 0 output of flip-flop 52, and the one on the $z$ bus 34 passes through the exclusive OR gate 52 and into the AND gate 58. Assuming that the up-going output $u$ has a one, then the AND gate 58 will deliver a one on its $u'$ input. If each of the other cells in the column has a one on its $z$ input and is a monitored cell, or is not monitored but has one for all of the cells of the column. Thus, the uppermost $u'$ output in each column will have the value one only for that column whose Q flip-flops are set in just those rows in which the Z cells also contain a one, and only in these rows. The $u'$ output of the uppermost cell is labeled $u_k$ and is shown in FIG. 3; it enters AND gate 24 of the X register cell 19. A clock pulse $C_2$ is now applied to AND gate 24 and the $u_k$ input causes the AND gate to trigger flip-flop 20, and change its state, in the one column in which the Q flip-flops and the Z-register contain the same pattern of ones and zeros. As a result, the data digit entered entered into the X flip-flop 20 is changed, either from zero to one or from one to zero, and the error is corrected.

A simplified example will now be given showing an array and the processes involved in encoding and decoding (error correcting). A single-error-correcting Hamming code is reppresented by the pattern [1011; 1110; 0111] which is set into the Q flip-flops of the array 12. FIG. 5 shows a typical code word, having seven digits including four digits in the positions labeled $X_1$ through $X_4$ and three check digits in the positions labeled $Z_1$ through $Z_3$. A particular word 1100101 of seven digits includes a first portion 1100 representing the data word, and a second portion 101 serving as a check word. In the encoding processes, the data word portion 1100 is known and the check word portion must be determined.

Figure 6:
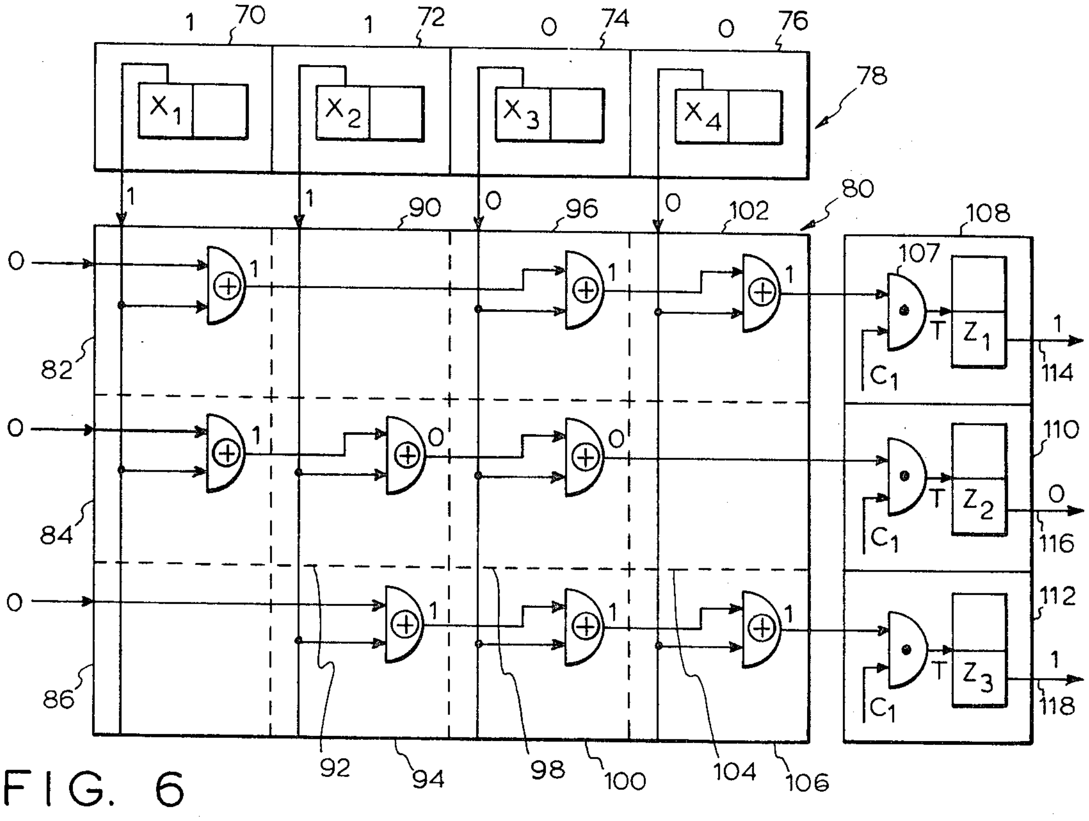
FIG. 6 is a partial schematic diagram of a simplified embodiment of the circuit of FIG. 1 illustrating the production of check digits for a data word.

The simplified circuit of FIG. 6 illustrates the manner by which the check word portion is obtained for a given data word 1100. The digits of the data word are entered into the four register cells 70, 72, 74, and 76 of the X register 78. As a result, the outputs of the X flip-flops $X_1$ and $X_2$ of cells 70 and 72 deliver a one (i.e. a voltage is present) to cells 82, 84 and 86 of the column under the flip-flop $X_1$ and to the cells 90, 92 and 94 in the column under the $X_2$ flip-flop. The cells of the array in the two columns under the $X_3$ and $X_4$ flip-flops all receive a zero.

Each of the twelve cells of the array 80 of FIG. 6 has an exclusive OR gate. However, in three of the cells 86, 90 and 104 the exclusive OR gates are effectively suppressed, since in these cells the Q-flip-flops contain a zero (i.e. they are reset), and the right-going line is effectively bussed through the cell. The output of each of the exclusive OR gates of the array is shown in the figure. For example, cell 82 receives a zero from its connection to the left edge of the array and a one on the column bus from flip-flop $X_1$, and its exclusive OR gate has an output that is 1. The right going output from cell 82 passes through the next cell 90 of the row and into an exclusive OR gate in cell 96. Cell 96 also receives a zero from its column bus and therefore delivers a one to cell 102. Cell 102 then delivers a one to the Z register cell 108 in the same row.

The one output from cell 102 enters an AND gate 107 in Z cell 108, and when a clock $C_1$ is delivered to that AND gate, a trigger output is delivered to flip-flop Z, of cell 108. The $Z_1$ flip-flop was originally reset, as were the $Z_2$ and $Z_3$ flip-flops of the other two Z cells 110 and 112. As a result, the $Z_1$ flip-flop becomes set and delivers a one output at line 114. In a similar manner, a zero is delivered to cell 110, and its $Z_2$ flip-flop remains reset and delivers a zero on its T output 116. Similarly, the Z cell 112 receives a one input and is triggered to cause its $Z_3$ flip-flop to deliver a one output on line 118. As a result of the foregoing, the three check digits one, zero, and one (101) are generated, which can then be appended to the data word 1100 to form the complete seven digit code word 1100101.

Figure 7:
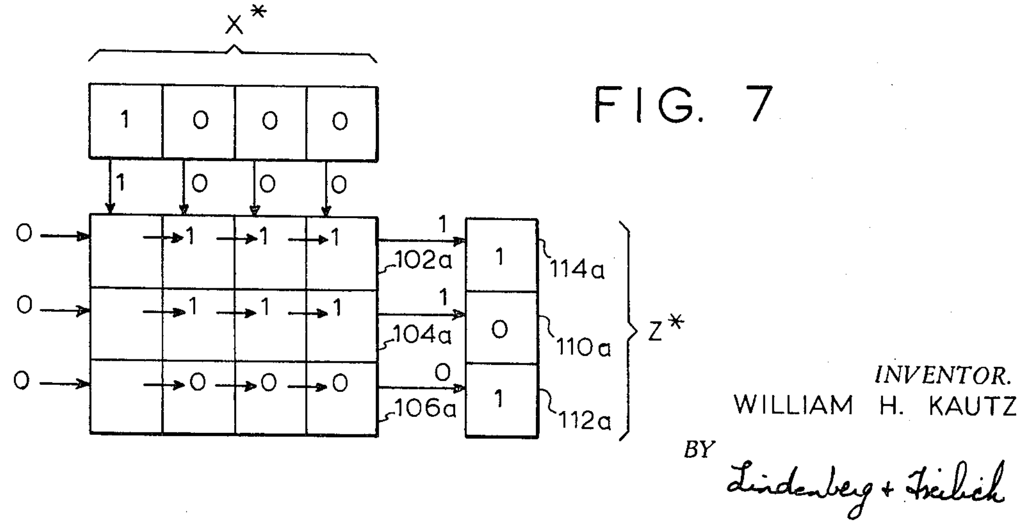
FIG. 7 is a representation of signals generated in a simplified embodiment of the circuit of FIG. 1 for a code word having one error.

FIG. 7 is a representation of the circuit of FIG. 6, showing only the values entered in the X and Z registers and the values of the signals transmitted along each row from one cell to its right neighbor. However the particular values shown in FIG. 7 are for the case where a seven digit word containing a single error has been entered into the registers. The error word 1000101 contains a data portion 1000 which has an error in its second place, so that the data word should be 1100. The three check digits are accurate. FIG. 7 shows how the array generates a set of check digits which is different from those entered into the Z register. This is due to the fact that the data digits are in error.

Figure 8:
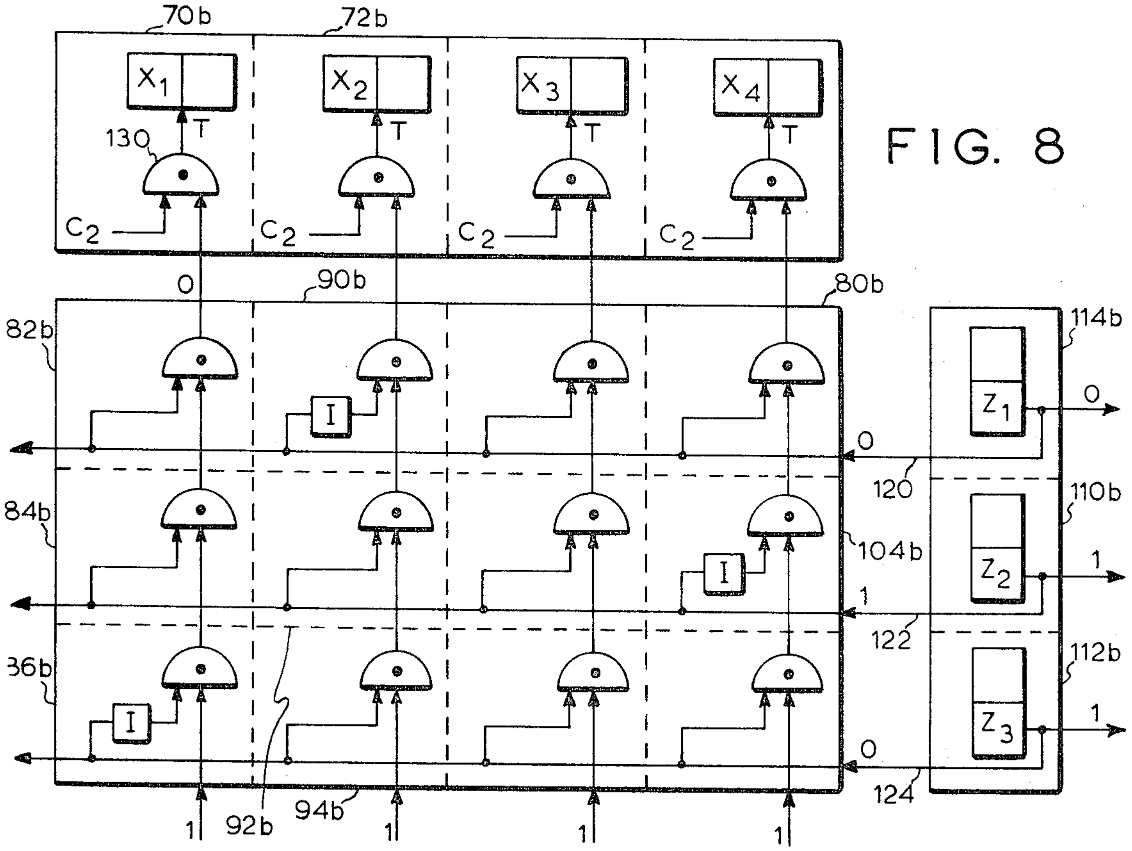
FIG. 8 is a representation of the circuit of FIG. 7 showing the signals generated in the course of the correction of a code word having one error.

FIG. 7 shows the signals transmitted by the X register to the signals transmitted by the X register to the array, and between each cell at the array before a clock $C_1$ has been delivered to the Z register cells. It can be seen that the output of the three rightmost cells 102a, 104a and 106a of the array is now 110, instead of the three check digits 101 already in the Z register. After a clock $C_1$ has been entered into the three Z cells, the flip-flop in two Z cells 114a and 110a will be triggered. As a result, the output of the three cells will be switched from 101, which exists before clock $C_1$, to 011 after clock $C_1$. This situation is illustrated in the circuit of FIG. 8, which shows the condition obtaining after clock $C_1$ has been delivered to the circuit of FIG. 7. The state shown in FIG. 8, like that for FIG. 7, is for the case where a data word portion 1000 containing one error has been entered into the X register, and the three check digits 101 accompanying that data word portion have been entered into three Z register cells and then modified into 011.

FIG. 8 illustrates the process involved in correcting the single error in the four-digit data word originally entered into the X register. As shown in the figure, the outputs of the three Z cells after clock $C_1$ is 011. If all seven digits of the code word were correct, i.e. if there did not exist a single error, then the outputs of the three Z cells 110b, 112b, and 114b would all have been triggered to a zero state and the Z cells would deliver the digits 000. The existence of an error results in two of the Z cells now delivering a one. The output of the three Z cells is commonly referred to as a syndrome. It indicates the existence of an error, and indirectly indicates the place where the error has occurred.

After the clock $C_1$ the flip-flops of the three Z cells deliver their outputs to three row busses labeled 120, 122 and 124, which deliver the Z outputs to all four cells in each row of the array. Each of the twelve cells of the array 80b contains an AND gate having two inputs. One of the inputs to the AND gate in each cell is the upgoing output from the cell below it. The other input to each AND gate is the $z$ output from the Z cell of the row in which the cell lies, except in the case of three cells 86b, 90b and 104b. In each of the three cells 86b, 90b and 104b, the circuitry between the Z bus and the AND gate essentially acts as an inventer, which delivers an output which is the inverse of the input. This is due to the fact that the Q flip-flop in each of three cells has been reset, instead of being set as in the case of the other nine cells. The up-going input to each of the four cells of the bottom row is a one.

The cell 86b has an AND gate which receives a one signal on one input and a zero on the other input (due to the fact that the one input on line 124 is converted to a zero by the inverter gate of cell 86b). As a result, the up-going output of cell 86b is a zero, resulting in the outputs of the gates in cells 84b and 82b, which are in the same column, to also be zero. Consequently, a zero is delivered to the AND gate 130 of the X register cell 70b, and at the time when a clock $C_2$ is also applied to that AND gate, that gate does not deliver any signal to the $X_1$ flip-flop in cell 70b. The net result is that the $X_1$ flip-flop is not triggered to a new state and the one stored $X_1$ remains.

The cell 94b of the array has an AND gate which receives a one from the input at the bottom edge of the array and a one from the $Z_3$ bus 124, causing it to deliver a one to the next cell 92b ob the column in which it lies. The cell 92b has an AND gate which also receives two inputs of one, from the cell 94b and from the $Z_2$ line 122, and it delivers a one to the AND gate of the cell 90b. The other input to the AND gate in cell 90b is also a one because the zero $Z_1$ bus 120 passes through an inverter gate circuit in cell 90b where it is converted to a one which enters the AND gate. The result is that a one is delivered from cell 90b to the $X_2$ cell 72b, to the AND gate thereof. Consequently at the time when pulse $C_2$ appears in the other input to the AND gate in cell 72b, the gate delivers a one to the trigger input of the $X_2$ flip-flop, thereby changing its state from zero to one and causing the error therein to be corrected.

By a tracing similar to that performed for the columns under $X_1$ and $X_2$, it can be shown that the flip-flops in $X_3$ and $X_4$ are not triggered and the contents thereof remain the same. As a result of the operations of the circuits, at the time when clock $C_2$ is delivered to the X register cells, the single error is corrected and the X register then contains the data digits 1100, instead of the erroneous digits 1000. Thus, a single error is corrected.

In those cases where an error occurs in one of the check digits, the data digits will all be correct, since it has been assumed that only a single error has occurred. No change in the data digits will take place when $C_2$ is applied. This is due to the fact that a single error in the check digits results in a syndrome (the contents of the Z register after clock $C_1$) containing only a single one. At least two ones must be contained in the syndrome in order for any of the data digits to be affected.

Thus, the circuit described not only enables the generation of check digits for a given data word, but also enables the correction of a single error in the data word. In addition to its usefulness for encoding and decoding single-error-correcting codes the array 12 of FIG. 1 is useful for encoding and decoding in accordance with codes which correct single errors and detect multiple errors. It may be noted that such codes generally provide for the detection of only a limited number of errors, such as three.

Because of the flexibility of the circuit of the invention, the same array can be used for a variety of different codes. This is important in situations where data processing equipment may be used in environments of varying noise levels. For low noise levels the possibility of more than one error may be so remote that a simple single-error-correcting code is sufficient. If the equipment is then used in a high-noise-level environment, the states of the Q flip-flops in the cells of the array may receive a change of state to enable the array to encode and decode in accordance with a single-error-correcting and multiple-error-detecting code. No wiring changes are necessary and any other code may be used so long as the array is sufficiently large.

The array of the invention also has the capability of fault avoidance, that is, if a defect occurs in a cell, the array can still be used simply by avoiding the use of the row and/or column which contains the defective cell. So long as the array contains at least one more column and row than is required for the size of the code word, this manner of fault avoidance can be used. Production costs are consequently decreased because arrays with a fault in a single cell do not have to be discarded, and equipment maintenance is more economical because faulty arrays do not have to be replaced if reconnections can be made to avoid the row and/or column containing the defective cell.

The array described is well adapted to realization using integrated semiconductor technology. The number of external leads required is relatively small considering the large amount of logic and storage circuitry within the array, so that the high reliability of integrated circuit technology for the internal connections of the array results in the elimination of the most critical areas of potential defect. The internal gating has the advantage of small fan-in and fan-out, that is, the gates have few inputs and drive few other gates, and short wire lengths are utilized, so that the circuitry operates at low power levels and at very high speeds. The only long lines are the busses which also happen to be the only lines which drive many gates, and therefore require heavy drive currents; however, the busses are driven from external sources (the X and Z registers), and external sources of high current capability are more easily obtained. Finally, the iterative (repetitive) layout permits ease of design, fabrication and testing to enable a maximization of the capabilities of the array in an economical manner.

While the particular circuitry shown in FIG. 2 can be utilized for each cell, other circuitry can be employed. The logic equations defining the relationship between the inputs and outputs of a cell are given by the equations:

$$u' = u(z \oplus \overline{Q})$$

$$y' = y \oplus Qx$$

$$S_q = xzC_3$$

$$R_q = C_4 = \text{“clear”}$$

Figure 9:
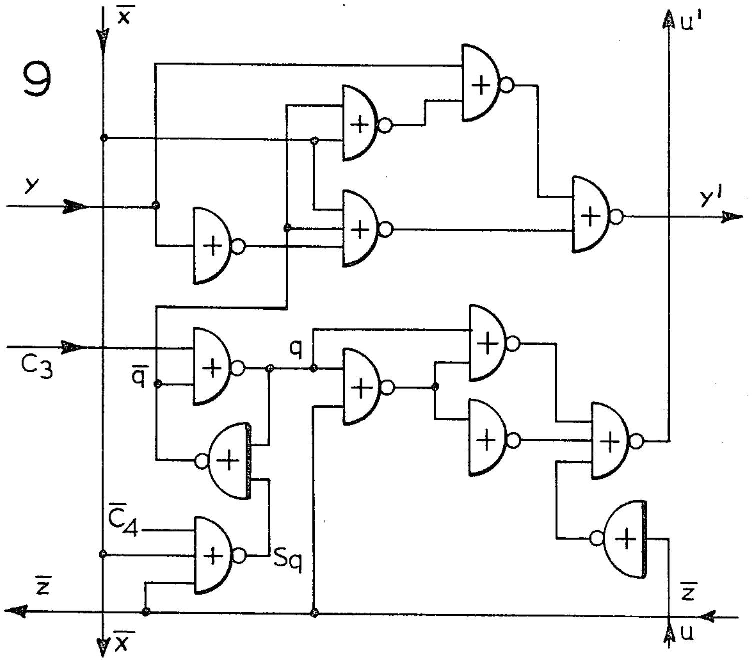
FIG. 9 is a schematic diagram of another embodiment of a cell which may be used in the array of FIG. 1, which utilizes only NOR gates.

Where, as shown in FIG. 2, $u$ is the column input, $u'$ is the column output, $y$ is the row input, $y'$ is the row output, $\overline{Q}$ represents the state of the cell flip-flop, and $\overline{Q}$ represents the other state of the cell flip-flop. $S_q$ is the signal which sets the cell flip-flop to the one state, and $R_q$ is the signal which resets the cell flip-flop so it is in the zero state. Another realization of an individual cell is shown in the circuit of FIG. 9, wherein only NOR gates are used. Each NOR gate delivers a one output only when all inputs are zero. The connections between cells are the same as for the cell of FIG. 2.

While particular embodiments of the invention have been illustrated and described, it should be understood that many modifications and variations may be resorted to by those skilled in the art, and the scope of the invention is limited only by a just interpretation of the following claims.

I claim:

1. An encoding array for generating check digits from data digits stored in a multiposition data word register, comprising:
- a plurality of logic means, each coupled to a unique set of digit positions of said data word register for generating a signal dependent upon the digit values stored therein; and
- a plurality of check register cells, each coupled to a different one of said logic means;
- each of said logic means comprising a plurality of cells, each cell having a first input connected to one of said digit positions of said data word register, a second input, an output, and means for generating a signal representative of the least significant digit of the sum of digit representations to a predetermined number base, of digit representations on said first and second inputs, and each logic means also including means connecting the plurality of cells of each logic means in tandem, with the output of a cell coupled to the second input of another cell.

2. An encoding array as defined in claim 1 wherein: said predetermined number base is two and said least significant digit is the modulo-two sum of the values received on said first and second inputs.

3. An encoding array for generating check digits from data digits stored in a multiposition data word register comprising:
- a plurality of logic means, each coupled to a unique set of digit positions of said data word register for generating a signal dependent upon the digit values stored therein; and
- a plurality of check register cells, each coupled to a different one of said logic means;
- each of said plurality of logic means comprising a plurality of cells, each cell having Exclusive OR gate means with a first input for receiving signals representing the digit value in a unique digit position of said data word register and a second input; and
- means connecting the output of the Exclusive OR gate means of each of said cells to the second input of the Exclusive OR gate means of another of said cells.

4. A decoding array for correcting an error in a complete word having data word digits and check digits comprising:
- a plurality of logic row means, each responsive to digit values in a unique set of monitored digit positions of said data word, for generating a signal representing a sum of the digit values in said unique set of digits;
- a plurality of check register cells, each having a memory responsive to a check digit of said complete word for registering said check digit, said memory having a trigger input responsive to said sum of said unique set of digits for changing the check digit representation of said memory; and
- a plurality of column logic means, each associated with one particular data word position and responsive to the digit representations in all of said check registers, for generating a first signal indicating the existence of a first digit in the memories of all check register cells connected to logic row means responsive to a unique set of data word digit positions containing said particular data digit and the existence of a second digit in the memories of all of the other said plurality of check register cells.

5. A decoding array as defined in claim 4 wherein each of said column logic means comprises:
- a plurality of AND gates, each AND gate having first and second gate inputs;
- first means connecting the memory of each check register cell to said first gate input of an AND gate in each column logic means associated with a particular data word position contained in the unique set of monitored digit positions monitored by the logic row means connected to that check register cell; and
- second means connecting the memory of each check register cell to said first gate input of an AND gate in each column logic means associated with a particular data word position not contained in the unique set of monitored digit positions monitored by the logic row means connected to that check register cell;
- said first means delivering a digit different from the digit delivered by said second means for the same digit representation in a check register memory to which they are connected.

6. An encoding-decoding array for receiving data word digits and generating or comparing check digits in accordance with any single-error-correcting, multiple-error detecting parity-check binary code, this array comprising:
- a plurality of array cells, each array cell having a first and second input and an output, and each array cell being a member of one of a plurality of first sets of cells and one of a plurality of second sets of cells;
- first means in a first plurality of said array cells for providing a signal on said output of each cell equal to the exclusive OR function of signals received on said first and second inputs of the cell;

means serially connecting the output of each array cell to the first input of a next succeeding array cell in the same first set of cells; and first bus means connecting together all of said second inputs of the array cells in the same second set of cells.

7. An encoding-decoding array as defined in claim 6 including:

second means in a second plurality of said array cells for providing a signal on the cell output equal to the signal received on said first input of the cell.

8. An encoding-decoding network as defined in claim 7 including:

an X register having a plurality of X register cells for receiving said data word digits;

a plurality of means connecting one of said X register cells to one of said bus means;

a Z register having a plurality of Z register cells for receiving check word digits associated with the data word digits in said X register cells; and a plurality of first set output means each connecting an output of one of said array cells of a first set of cells to one of said Z register cells.

9. An encoding-decoding array as defined in claim 8 including:

memory means in each of said Z register cells for establishing a state of the cell, said means including a trigger input connected to one of said first set output means for receiving signals changing the state of said Z register cell;

error detection means associated with each of said Z register cells, each of said error detection means comprising an OR gate having a first input connected to an output of the memory means of the Z register cell with which it is associated, and a second input; and means correcting the second input and the output of said OR gates in tandem.

10. An encoding-decoding array as defined in claim 7 wherein:

each of said array cells includes a third and fourth input and a second output; and including third means in said first plurality of array cells for providing a signal on said second output equal to the AND function of said third and fourth inputs to the cell;

fourth means in said second plurality of array cells for providing a signal on the output of each cell equal to the AND function of said fourth input and the inverse of said third input to the cell;

means serially connecting the second output of each array cell to the fourth input of a next succeeding array cell of the same second set of cells; and a plurality of second bus means connecting together all of said third inputs of the array cells of each first set of cells.

11. An encoding-decoding array as defined in claim 10 including:

a Z register having a plurality of Z register cells, each cell having an input and an output, and each cell corresponding to one of said first sets of array cells;

means connecting the first output of one of said array cells in each of said first sets of cells to said input of a corresponding Z register cell; and means connecting said output of each Z cell to said second bus means of a corresponding first set of array cells.

12. An encoding-decoding array comprising:

a multiplicity of cells operationally arranged in rows and columns, each cell having row and column inputs and outputs connected to preceding and succeeding adjacent cells in the same row and preceding and succeeding adjacent cells in the same column, including column bus means for carrying a signal to all cells in a column and row bus means for carrying signals to all cells in a row;

each of said cells having exclusive OR gate means for transmitting to the succeeding adjacent cell in the same row an exclusive OR function of the signal received from the preceding cell in the same row and a first function of the signal received from the column bus of the column containing said cell;

each cell having AND gate means for delivering to the succeeding cell in the same column, an output which is the AND function of a signal received from the preceding cell in the same column and a second function of the signal from the row bus line of the row containing said cell; and each of said cells having state means for selectively establishing the cell in a first state wherein said first function equals the signal received from said column bus of the column containing the cell and said second function equals the signal received from said row bus line of the row containing the cell, and a second state wherein said first function equals zero and said second function equals the complement of the signal received from said row bus line.

13. An encoding-decoding array as defined in claim 12 wherein:

said state means comprises a flip-flop circuit having set and reset states; and said exclusive OR gate means comprises an AND gate having one input connected to one output of said flip-flop and having another input connected to said column bus of said cell and an exclusive OR gate having one input connected to the output of said AND gate and another input connected to the output of the preceding cell of the same row, said exclusive OR gate having an output which is connected to the input of the succeeding cell of the same row, whereby to make the row output of a cell selectively dependent upon its state.

14. An encoding-decoding array as defined in claim 12 whereby:

said state means comprises a flip-flop having set and reset states; and said AND gate means comprises an exclusive OR gate having one input connected to an output of said flip-flop and another input connected to said row bus of said row in which said cell is located, and an AND gate having one input connected to the output of said exclusive OR gate and another input connected to the column output of the preceding cell of the same column, the output of said AND gate connected to the column output of said cell, whereby to make the column output of said cell selectively dependent upon the state of the cell.

15. An encoding-decoding array as defined in claim 12 wherein:

said state means comprises a flip-flop having a first input for setting the flip-flop and a second input for resetting the flip-flop, and an AND gate having one input connected to said column bus of the cell, a second input connected to the row bus of the cell, a third input for receiving clock pulses, and an output connected to one of the inputs of said flip-flop, whereby to enable the establishment of a desired state of said flip-flop and of said cell by transmitting predetermined signals on the column bus and row bus of that cell simultaneously with the trasmittal of a clock signal on said third input.

16. An encoding-decoding array as defined in claim 12 wherein:

each column of cells of said array includes a last cell having a column input from a preceding cell in the same column and having a column output unconnected to a succeeding cell; and including an X register having a plurality of cells, each cell having a flip-flop with an output connected to the column bus of a column of cells of said array, a trigger input, and means connecting said trigger input to the column output of said last cell of the same column to which the output of said flip-flop of said X register cell is connected.

17. An encoding-decoding array as defined in claim 16 wherein:

said means for connecting said trigger input of said X register cell to said output of said last cell comprises an AND gate having one input connected to said output of said last cell, a second input for receiving clock pulses, and an output connected to said trigger input of said flip-flop.

18. An encoding-decoding array as defined in claim 12 including:

each row of cells of said array includes a last cell having a row output from a preceding cell in the same row and having a row output unconnected to a succeeding cell; and including a Z register comprising a plurality of register cells, each having a flip-flop with an output connected to a row bus of a row of said array, each of said flip-flops having a trigger input; and means connecting said trigger input to said row output of the last cell in the row of the array to which said output of said ffip-flop is connected.

19. A coding-decoding array as defined in claim 16 wherein:

said means connecting said trigger input of said flip-flop to said row output of said last cell comprises an AND gate having one input connected to said output of said last cell in said row, a second input for receiving clock pulses, and an output connected to said trigger input of said flip-flop.

20. An encoding-decoding array comprising:

a multiplicity of array cells arranged in columns and rows, each cell having first and second column inputs, a column output, first and second row inputs and a row output;

a column bus associated with each cell of a column, and connecting together all of said first inputs of said cells in the column;

a row bus associated with each cell of a row and connecting together said first row inputs of all of the cells in the row;

means connecting said column output of each cell to said second column input of an adjacent cell in the same column; and means connecting said row output of each cell to said second row input of a neighboring cell of the same row; and wherein the relationship between the inputs and outputs of each of said cells is defined by the equations $u'=u\ (z\oplus\overline{Q})$ and $y'=y\oplus Qx$, where $u$ is said second column input of each cell, $u'$ is said colum output of each cell, $y$ is said second row input of each cell, $y'$ is said row output of each cell, $x$ is said first column input of each cell, $z$ is said first row input of each cell, Q represents a first state of each cell and $\overline{Q}$ represents a second state of each cell.

References Cited

C. H. Wolf, Multiple Channel Correction of Burst Errors, in IBM Technical Disclosure Bulletin 7(3): pp. 190–191, August 1964.

MALCOM A. MORRISON, Primary Examiner

R. S. DILDINE, Jr., Assistant Examiner

U.S. Cl. X.R.

235—153; 340—166